United States Patent [19]

Mori

[11] 3,740,953
[45] June 26, 1973

[54] HYDROSTATIC POWER TRANSMISSION SYSTEM
[75] Inventor: Yoichi Mori, Yokohama, Japan
[73] Assignee: Nissan Motor Company, Limited, Yokohama, Japan
[22] Filed: Dec. 27, 1971
[21] Appl. No.: 211,893

[30] Foreign Application Priority Data
Dec. 28, 1970 Japan............................ 45/119985

[52] U.S. Cl..................................... 60/489, 60/490
[51] Int. Cl........................ F16h 39/16, F16h 39/46
[58] Field of Search..................... 60/53 B, 489, 490

[56] References Cited
UNITED STATES PATENTS

| | | | |
|---|---|---|---|
| 2,866,150 | 12/1958 | Lewis | 322/32 |
| 2,872,875 | 2/1959 | Mergen et al. | 19/493 |
| 3,205,660 | 9/1965 | Croswhite | 60/486 |
| 3,237,398 | 3/1966 | Croswhite | 60/433 |

Primary Examiner—Edgar W. Geoghegan
Attorney—John Lezdey

[57] ABSTRACT

An improved hydrostatic power transmission is disclosed including first, second and third fluid displacement units, of which the first and second fluid displacement units are constructed as variable-displacement and constant-displacement units, respectively, while the third fluid displacement unit may be constructed either as a variable-displacement or as a constant-displacement unit as the case may be. The transmission system features split-power characteristics in which the second fluid displacement unit acts not only as a hydrostatic unit but as a mechanical reaction unit whereby the input power is split into two input and/or output components. The transmission efficiency is consequently increased to a significant extent in spite of the simple and small-sized construction of the transmission system. A typical practical application of the transmission system is motor vehicles including heavy-duty industrial vehicles in which powerful braking actions are required when they are to be stopped.

17 Claims, 4 Drawing Figures

Fig. 3

HYDROSTATIC POWER TRANSMISSION SYSTEM

This invention is concerned generally with power transmission systems and has its particular reference to a hydrostatic power transmission system providing steplessly variable speed ratio characteristics. The power transmission system herein dealt with is specifically adapted to be used in an automotive vehicle driveline for delivering power from a vehicle power plant such as an internal combustion engine or a gas turbine engine to the vehicle traction wheels. Such power transmission system uses positive-displacement piston-type hydrostatic units having a closed hydrostatic circuit to provide power delivery paths from a driving member to a driven member.

Hydrostatic power transmissions generally use a variable-displacement pump unit acting as a source of fluid power and a constant-displacement hydraulic motor unit usually driven by the pump unit. Both the pump and motor units are of the piston type using, for instance, ball pistons and are respectively connected to suitable driving and driven members which may be input and output shafts of a power train of automotive vehicles. Power from the driving member or input shaft is delivered to the driven member or output shaft by the aid of the fluid as a result of the pump delivery and the fluid pressure.

The positive-displacement piston-type hydrostatic power transmissions are adapted to provide ease and simplicity of operation because of their ability to steplessly deliver outputs of various speeds from a source of power having a given revolution speed and because of the fact that the stepless change of the revolution speed and even reversed motions of the hydraulic motor units can be effected without use of clutches and geared reduction mechanisms. Less shooks and vibrations are invited than in the purely mechanical power transmissions and fluctuations in the torque transmitted are largely subdued by the working fluid itself, thus reducing to a minimum the time and labour for the periodical inspection and maintenance servicing of the transmission as a whole.

Hydrostatic power transmissions of modified types are known in which the fluid power acting upon the pump and motor units is split into two input or output components in the hydrostatic circuit. Where the fluid power is to be split into input components, recirculation of the power is brought about during deceleration condition in which the vehicle drives the power plant, thereby causing reduction in the transmission efficiency. This problem is avoided in the hydrostatic power transmission in which the fluid power is split into output components but, in the power transmission of this particular type, the range of the reduction ratios available is limited due to restrictions resulting from the very construction of the transmission. Since, moreover, the pressurized fluid in the hydrostatic circuit should be partially drained off when the transmission is about to establish a neutral condition interrupting delivery of power to the driven member, braking actions attained in the transmission alone are insufficient to bring the vehicle to a full stop. The hydrostatic power transmission of the split-output type is, thus, not applicable to heavy-duty industrial vehicles such as bulldozers, tractors and fork lift trucks.

It is, therefore, an object of this invention to provide an improved positive-displacement hydrostatic power transmission system of the split-power type which is cleared of these drawbacks inherent in the prior art hydrostatic power transmissions of the split-input or split-output type.

It is, thus, another object of this invention to provide an improved variable-speed hydrostatic power transmission system in which the power acting upon the hydrostatic units forming part of the transmission system is split into mechanical and hydraulic components so as to provide increased speed and torque transmission efficiencies throughout various modes of operation including the deceleration and neutral conditions.

It is still another object of the invention to provide an improved variable-speed power transmission system in which braking actions of sufficient magnitudes can be applied on the driven member under the neutral condition of the transmission system. The hydrostatic power transmission having such feature is successfully applicable to heavy-duty industrial vehicles.

It is still another object of the invention to provide an improved hydrostatic power transmission system of the split-power characteristics in which the speed and torque ratios between the driving and driven members are varied stoplessly in either direction from zero to infinity at satisfactorily high efficiencies under the various modes of operation.

It is still another object of the invention to provide an improved positive-displacement variable-speed hydrostatic power transmission system in which the power transmission system in which the power supplied thereto is split into input and/or output components without use of mechanical clutches and geared reduction mechanisms.

It is still another object of the invention to provide an improved positive-displacement variable-speed hydrostatic power transmission system which is simple in construction and operation and which is capable of dealing with great power in spite of its relatively small-sized construction.

It is still another object of the invention to provide an improved hydrostatic power transmission system which can be snugly and compactly installed on automotive and industrial vehicles.

These and other objects of this invention are advantageously accomplished in a hydrostatic power transmission which includes first, second and third fluid displacement units cooperating with each other. Each of these fluid displacement units comprises a rotatable cylinder block coaxial with the driving or driven member and a cam ring having an inner cam surface and positioned around the cylinder block. The cylinder blocks of the first and second fluid displacement units are rotatable with a driving member and the cam ring of the second fluid displacement unit and the cylinder block of the third fluid displacement unit are rotatable with or in driving engagement with a driven member. Each of the cylinder blocks has a plurality of cylinders which are directed toward an axis of rotation of the cylinder block and a plurality of piston elements which are respectively received within these cylinders in a manner to be movable toward and away from the axis of rotation of the cylinder block. The piston elements are in frictional engagement with the inner cam surface of the associated cam ring. The cam ring of the first fluid displacement unit is movable over the associated cylinder block in a plane transverse to the axis of rotation of the cylinder block for providing controlled degrees of eccentricity between the inner cam surface of the particular cam ring and the above mentioned axis. Associated with this cam ring of the first fluid displacement unit is actuating means which is adapted to displace the cam ring at a right angle to the axis of rotation of the associated cylinder block for varying the displacement of the first fluid displacement unit in accordance with desired operating conditions. The cam ring of the second fluid displacement unit, on the other hand, is held stationary so that the displacement of the second fluid displacement unit is kept constant. Fluid pressure distribution passage means provides controlled fluid communication between the cylinders of the first, second and third fluid displacement units for radially outwardly biasing the piston elements received therewithin. The first fluid displacement unit is operable to displace the fluid in either direction from zero to maximum and the maximum displacement per turn of the cylinder block thereof is greater than the displacement of the second displacement unit. The third fluid displacement unit is operable to displace the fluid in a fixed direction which usually corresponds to the direction of rotation of the driving member.

Under an underdrive condition in which the driven member is to be driven at a speed relatively lower than and in the same direction as the driving member, the adjustable cam ring of the first fluid displacement unit is moved relative to the associated cylinder block to a position in which the displacement thereof is smaller than the displacement of the second fluid displacement unit. In this condition, the displacement of the second fluid displacement unit is split into two components, one of which acts upon the third fluid displacement unit to increase the torque on the driven member and the other of which acts upon the first fluid displacement unit so as to increase the torque on the input shaft. The transmission system thus operates in such a manner as to have its fluid power split into input and output components under the underdrive condition.

The first fluid displacement unit is constructed as a variable-displacement unit while the second fluid displacement unit is constructed as a constant-displacement unit. The third fluid displacement unit, on the other hand, may be either a variable-displacement unit or a constant-displacement unit as the case may be. Where the third fluid displacement unit is constructed as the variable-displacement unit with its cam ring rockable with respect to the associated cylinder block, the unit is adjusted to provide a maximum displacement during the neutral, underdrive and reverse drive conditions, in which the displacement of the first fluid displacement alone is varied from minus to plus values through zero whereby the power is split in different manners. Under deceleration condition with the driven member driven at considerably high speeds, the cam ring of the first fluid displacement unit is moved to be in concentric alignment with the axis of rotation of the associated cylinder block so that the delivery of the fluid therefrom is interrupted. In this condition, only the displacement of the third fluid displacement unit is varied or decreased so that the fluid power is split into two output components. When, furthermore, the driven member is to be coupled with and driven at the same speed and in the same direction as the driving member to establish a direct drive condition, the displacements of the first and third fluid displacement units are interrupted concurrently. The second fluid displacement unit is consequently brought into a so-called hydraulic lock condition so that the transmission system operates as an integral unit. To establish an overdrive condition, the displacement of the third fluid displacement unit is interrupted and at the same time the direction of the displacement of the first fluid displacement unit is reversed, the fluid power thus being split into input components.

Where, on the other hand, the third fluid displacement unit is constructed as the constant-displacement unit with its cam ring fixed relative to the associated cylinder block, the transmission system now acts as a so-called hyperbolic system in which the over-all speed reduction ratio that can be achieved is related to the ratio with a hyperbolic function containing only one variable which is the displacement of the first fluid displacement unit. In this instance, the driven member stops when the displacement of the first fluid displacement unit is equalized with that of the second fluid displacement unit. As the displacement of the first displacement unit becomes smaller than the displacement of the second fluid displacement unit, then the driven member is driven in the same direction as the driving member. As the displacement of the first fluid displacement unit exceeds the displacement of the second fluid displacement unit, the driven member is driven in the reverse direction. When the direction of the displacement of the first fluid displacement unit is reversed and the absolute value of the displacement is equalized with the displacement of the third fluid displacement unit, then the driven member is coupled with the driving member so that the two members operate at the same speed. When, furthermore, the absolute value of the displacement of the first fluid displacement unit is greater than the absolute value of the displacement of the third fluid displacement unit, then an overdrive condition is established in the transmission system.

The fluid pressure distribution passage means may be provided by axial bores formed in the driving and driven members which are in line with each other. The bores in the driving and driven members communicate with each other at their respective ends and with the cylinders of the first, second and third fluid displacement units through ports and grooves formed in the driving and driven members and in sleeves mounted on outer peripheral surfaces of the members. Such fluid pressure distribution passage means is occupied with a fluid under pressure so that the ball piston elements in the fluid displacement units are constantly biased radially outwardly.

The aligned bores in the driving and driven members are closed at their opposed ends. Where, however, the third fluid displacement unit is constructed as the variable-displacement unit with its cam ring position-adjustable with respect to the associated cylinder, the bores in the driving and driven members may be provided with extensions at their opposed ends so as to accommodate therein a pair of valve means which are respectively associated with the first and third fluid displacement units having the variable-displacement characteristics. When the cam rings of the first and third fluid displacement units are adjusted so that the displacements thereof are interrupted, these valves are caused to block entry of the highly pressurized fluid into the cylinders of these fluid displacement units. Thus, even though the cylinders of the first and third fluid displacement units are open to the fluid pressure distribution passage means due to variation in the angular positions of the cylinder blocks relative to the passage means, pulsating fluid pressures are not imparted to the first and third fluid displacement units. Production of noises otherwise produced under the direct drive condition of the transmission system is avoided in this manner and, on top of this, leakage of the fluid from the first and third fluid displacement units is minimized so as to save the fluid distribution efficiency from being degraded.

The modes of operation of the transmission system thus constructed can be varied steplessly simply by varying the angular position of the variable-displacement unit or units of the transmission system by the use of the actuating means which is adapted to be responsive to the desired operating conditions. Only a limited amount of reaction is imparted to such actuating means during operation because the cam ring of the variable-displacement unit is arranged to be readily rockable around the associated cylinder block.

The features and advantages of the hydrostatic power transmission system implementing this invention will be more clearly understood from the following description and from the accompanying drawings, in which:

FIG. 3 is a view similar to FIG. 1 but now shows another preferred embodiment of the power transmission system of this invention.

While the embodiments of the system according to this invention will be described as being of the character using ball pistons, such is solely for illustrative purposes and it should be borne in mind that the gist of the invention is applicable to the hydrostatic transmissions using swash plates and axial pistons or vaned pumps.

Figure 1:
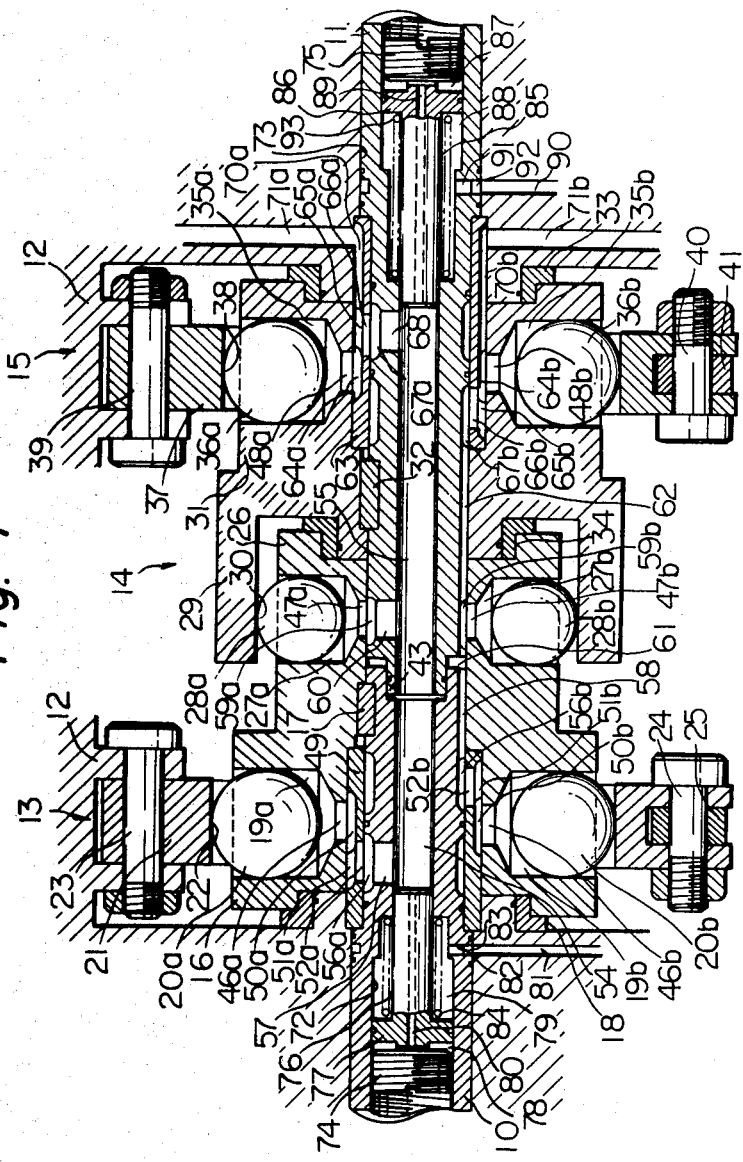
FIG. 1 is a lengthwise sectional view showing a preferred embodiment of the hydrostatic power transmission system according to this invention.

Reference is now made to the drawings, first to FIG. 1. The hydrostatic power transmission system as shown intervenes between an input shaft 10 as a driving member and an output shaft 11 as a driven member so that the power is delivered from the input shaft 10 to the output shaft 11 by the transmission system. Where the transmission system is incorporated in a motor vehicle, the input shaft 10 is connected to and driven by a crankshaft of a vehicle power plant such as an internal combustion engine or a gas turbine engine and the output shaft 11 is connected to the vehicle traction wheels via a suitable driveline, though not shown. The transmission system as a whole is encased in a transmission housing which is generally indicated by reference numeral 12 in FIG. 1.

The hydrostatic power transmission system is essentially made up of first, second and third fluid displacement units 13, 14 and 15, respectively. The first and third fluid displacement units 13 and 15, respectively, are constructed as variable-displacement units while the second fluid displacement unit 14 constructed as a constant-displacement unit.

The first fluid displacement unit 13 includes a cylinder block 16 which is rotatable with the input shaft 10 through a key 17 interposed therebetween. If desired, the cylinder block 16 may be splined to the input shaft 10 without use of the key 17, though not shown as such. The cylinder block 16 is supported on the transmission housing 12 through an annular bearing 18. This cylinder block 16 has a generally circular cross section and is formed with a suitable number of substantially equidistantly spaced piston cylinders which are shown to be constituted by cylindrical openings or chambers of which only two are seen in FIG. 1 as indicated by reference numerals 19a and 19b. These cylindrical chambers are all directed toward an axis of rotation of the cylinder block 16 and the cylindrical chambers 19a and 19b as shown are assumed to be substantially diametrically opposed to each other. Ball piston elements 20a, 20b, . . . are received within the cylindrical chambers 19a, 19b, . . . respectively, in a manner to be slidable toward and away from the axis of rotation of the cylinder block 16. The cylinder block 16 is surrounded by an adjustable cam ring 21 having a circular inner cam surface. The individual ball piston elements 20a, 20b, . . . are in frictional engagement with this inner cam surface of the cam ring 21. This inner cam surface may be formed with an annular groove 22 thereby to add to the area of frictional contact between the ball piston elements and the cam ring. The cam ring 21 is pivotally supported by the transmission housing 12 through a pin 23 so as to be rockable around the peripheral wall of the cylinder block 16 in a plane transverse to the axis of rotation of the cylinder block. The cam ring 21 thus being position-adjustable with respect to the associated cylinder block 16, controlled degrees of eccentricity are defined between the cam ring and the axis of rotation of the cylinder block depending upon the angular positions of the cam ring. This angular position of the cam ring is varied by suitable actuating means, not shown, which is operatively connected to the cam ring through a pin 24. This actuating means is either manually or automatically operated in accordance with the desired operating conditions of the motor vehicle, for instance. Where the actuating means is to be automatically operated, the means may include a suitable fluid operated servo mechanism responsive to the operating conditions of the motor vehicle and connected to the pin 24 of the cam ring 21 through a piston rod 25 as shown.

The second fluid displacement unit 14 includes a cylinder block 26 which is rotatable together with the cylinder block 16 of the first fluid displacement unit 13 and on the output shaft 11. This cylinder block 26 is thus illustrated as integral with the cylinder block 16 of the unit 13. Similarly to the cylinder block 16, the cylinder block 26 has a circular cross section and is formed with a plurality of radially extending spaced cylindrical chambers 27a, 27b, . . . , of which the chambers 27a and 27b as seen in FIG. 1 are assumed to be diametrically opposed to each other. Ball piston elements 28a, 28b, . . . are received within the cylindrical chambers 27a, 27b, . . . , respectively, in a manner to be slidable toward and away from an axis of rotation of the cylinder block 26. A cam ring 29 is eccentrically positioned around the cylinder block 26 and has a circular inner cam surface with which the ball piston elements 28a, 28b, . . . are constantly in frictional engagement. The degree of the eccentricity between the inner cam surface of the cam ring 29 and the axis of rotation of the cylinder block 26 is kept constant so that the ball piston elements 28a, 28b, . . . reciprocate within the cylindrical chambers 27a, 27b, . . . at all times in a regular manner. The cam ring 29 may have formed in its inner cam surface an annular groove 30 so as to add to the area of friction between the ball piston elements 28a, 28b, . . . and the cam ring 29. The second fluid displacement unit 14 is in this manner constructed to act as a constant displacement unit.

The third fluid displacement unit 15 of the transmission system illustrated in FIG. 1 is essentially similar in construction to the first fluid displacement unit 13, constructed as the variable displacement unit. Thus, the third fluid displacement unit 15 includes a cylinder block 31 which is rotatable with the output shaft 11 through a key 32 interposed therebetween. The cylinder block 31 is integral with the cam ring 29 of the second fluid displacement unit 14 so that the cylinder block 31 and the cam ring 29 are rotatable together. The cylinder block 31 is supported by the transmission housing 12 through an annular bearing 33 and the rotation thereof is isolated from the rotation of the cylinder block 26 of the second fluid displacement unit 14 by means of an annular bearing 34 which is interposed between these cylinder blocks 26 and 31. A plurality of spaced cylindrical chambers 35a, 35b, . . . are formed radially in the cylinder block 31, of which the two cylindrical chambers 35a and 35b are herein assumed to be diametrically opposed to each other. The cylindrical chambers 35a, 35b, . . . receive therewithin ball piston elements 36a, 36b, . . . , respectively, which are slidable toward and away from an axis of rotation of the cylinder block 31. An adjustable cam ring 37 having a circular inner cam surface is positioned around the cylinder block. The cam surface of this cam ring 37 may preferably be formed with an annular groove 38 for the reason previously discussed. The cam ring 37 is pivotally supported by the transmission housing 12 through a pin 39 so as to be rockable with respect to the associated cylinder block 31 in a plane which is substantially at a right angle to the axis of rotation of the cylinder block, whereby controlled degrees of eccentricity can be established between the inner cam surface of the cam ring 37 and the axis of rotation of the cylinder block 31. The cam ring 37 is position-adjusted with respect to the cylinder block 31 by suitable actuating means, not shown, to which the cam ring may be operatively connected through one pin 40. This actuating means may be constructed essentially similarly to its counterpart in the first fluid displacement unit 13 and, where such means is to include a fluid operated servo mechanism as previously mentioned, the servo mechanism may be connected to the pin 40 for the cam ring 19 through a piston rod 41 as illustrated.

Fluid communication is provided between the cylindrical chambers of the first, second and third fluid displacement units 13, 14 and 15, respectively, through pressure distribution passage means, whereby torques are transmitted therebetween under various modes of operation of the transmission system. For this purpose, the cylinder blocks 16, 26 and 31 have formed in their inner peripheral walls radial ports 46a, 46b, . . . , 47a, 47b, . . . and 48a, 48b, . . . which emerge from the cylindrical chambers 19a, 19b, . . . , 27a, 27b, . . . and 35a, 35b, . . . , respectively, and open toward the input and output shafts 10 and 11. A sleeve 49 surrounds that portion of the input shaft 10 which is approximately coextensive with the cylinder block 16 of the first fluid displacement unit 13. This sleeve 49 is held stationary relative to the transmission housing 12. A pair of semi-circumferential grooves 50a and 50b are formed in an outer peripheral wall of the sleeve 49. These circumferential ports 50a and 50b are diametrically opposed to each other and are periodically in communication with the radial ports 46a, 46b, . . . as the cylinder block 16 is rotated with the input shaft 10. The semi-circumferential grooves 50a and 50b communicate with elongated grooves 51a and 51b, respectively, which are formed longitudinally in the outer peripheral wall of the sleeve 49. This sleeve 49 is further formed with radial ports 52a and 52b which lead from the elongated grooves 51a and 51b, respectively.

The input and output shafts 10 and 11, respectively, are joined to each other through spigot connection as at 43 in such a manner that the output shaft 11 is free from the rotation of the input shaft 10. The input and output shafts 10 and 11 have formed therein axial bores 54 and 55, respectively, which meet each other at $t_3$. Thus, the axial bore 54 is opened at the terminal end of the input shaft 10 while the axial bore 55 is opened at the starting end of the output shaft 11. These axial bores 54 and 55 as a whole are at least partly coextensive with an assembly of the first, second and third fluid displacement units 13, 14 and 15, respectively, and are closed at their opposed ends in a suitable manner which will be described later.

The input shaft 10 has formed in its outer peripheral wall a pair of spaced annular grooves 56a and 56b which are aligned with the radial ports 52a and 52b, respectively, in the sleeve 49. The annular groove 56a is in communication with the axial bore 54 in the input shaft 10 through a radial passage 57 which is formed in the input shaft as illustrated. The annular groove 56b, on the other hand, communicates with an elongated groove 58 which is formed longitudinally in the outer peripheral wall of the input shaft 10 and which terminates at the end of the input shaft close to the output shaft 11. Thus, as the input shaft 10 and the cylinder block 16 mounted thereon are rotated with respect to the stationary sleeve 49, fluid communication is periodically established between the cylindrical chambers 19a and 19b in the cylinder block 16 and the bore 54 and elongated groove 58 in the input shaft 10. More specifically, the communication between the chamber 19a and the axial bore 54 is provided through the radial port 46a in the cylinder block, the semi-circumferential groove 50a, elongated groove 51a and radial port 52a in the sleeve 49, and the annular groove 56a and passage 57 in the input shaft 10 The communication between the chamber 19b and the elongated groove 58, on the other hand, is provided through the radial port 46b in the cylinder block 16, the semi-circumferential groove 50b, elongated groove 51b and radial port 52b in the sleeve 49, and the annular groove 56b in the input shaft 10.

The output shaft 11 has formed in its outer peripheral wall close to the input shaft 10 a pair of substantially diametrically opposed semi-circumferential grooves 59a and 59b which are aligned with the radial ports 47a, 47b, . . . in the cylinder block 26 of the second fluid displacement unit 14. The semi-circumferential groove 59a, which is shown as instantly in alingment with the radial port 47a, communicates with the axial bore 55 in the output shaft through a radial passage 60 formed in the output shaft. The semi-circumferential groove 59b, which is shown as instantly in alignment with the radial port 47b, emerges from the elongated groove 58 in the input shaft 10 through an annular groove 61 which is formed between joined end walls of the input and output shafts 10 and 11, respectively. The semi-circumferential groove 59b leads to an elongated groove 62 which is formed longitudinally in the outer peripheral wall of the output shaft 11. The axial bore 55 and the elongated groove 62 formed in the output shaft 11 are in this manner periodically permitted to communicate with the cylindrical chambers 27a, 27b, . . . as the cylinder block 26 rotates relative to the output shaft 11.

The output shaft 11 has its portion approximately coextensive with the cylinder block 31 of the third fluid displacement unit 15 surrounded by a sleeve 63 which is stationary relative to the transmission housing 12. The sleeve 63 has formed in its outer peripheral wall a pair of diametrically opposed semi-circumferential grooves 64a and 64b which are periodically in communication with the radial ports 48a, 48b, . . . in the cylinder block 31 as this cylinder block rotates with respect to the sleeve. The semi-circumferential grooves 64a and 64b merge into elongated grooves 65a and 65b, respectively, which are formed longitudinally in the outer peripheral wall of the sleeve 63. The sleeve 63 is further formed with radial ports 66a and 66b which emerge from the elongated grooves 65a and 65b, respectively.

Close to the cylinder block 31 of the third fluid displacement unit 15 have formed in the outer peripheral wall of the output shaft 11 a pair of spaced annular grooves 67a and 67b which are aligned with the radial ports 66a and 66b, respectively, in the sleeve 63. The annular groove 67a, which is shown as instantly in communication with the radial port 66a, communicates with the axial bore 55 in the output shaft 11 through a radial passage 68 formed in the output shaft. The other annular groove 67b, which is shown as instantly in communication with the radial port 66b, communicates with the semi-circumferential groove 59b for the second fluid displacement unit 14 through an elongated groove 62 formed longitudinally in the outer peripheral wall of the output shaft 11. This elongated groove 62 is at all times in communication with the elongted groove 58 in the input shaft 10 through provision of the annular groove 61 between these elongated grooves. Thus, as the output shaft 11 and the cylinder block 31 mounted thereon are rotated together with respect of the stationary sleeve 63, fluid communication is periodically established between the cylindrical chambers 35a and 35b and the axial bore 55 and the elongated groove 62, respectively, in the output shaft 11. The communication between the chamber 35a and the axial bore 55 is provided through the radial port 48a in the cylinder block 31, the semi-circumferential groove 64a, elongated groove 65a and radial port 66a in the sleeve 63, and the annular groove 67a and radial passage 68 in the output shaft. The communication between the chamber 35b and the elongated groove 62, on the other hand, is provided through the radial port 48b in the cylinder block 31, the semi-circumferential groove 64b, elongated groove 65b and radial port 66b in the sleeve 63, and the annular groove 67b in the output shaft 11, as illustrated in FIG. 1.

The sleeve 63 is further formed with elongated grooves 70a and 70b leading from its radial ports 66a and 66b, respectively. These elongated grooves 70a and 70b are enclosed in the transmission housing 12 and communicate with fluid supply passages 71a and 71b, respectively, which are formed in the transmission housing as shown. Though not illustrated, these fluid supply passages 71a and 71b lead from a source or sources of fluid under pressure through suitable one-way check valves so that the loss in the fluid in the above described hydrostatic circuit resulting from the possible leakage of the fluid therefrom is compensated for. These passages 71a and 71b are usually further provided with suitable relief valves, not shown, which are adapted to prevent the fluid pressure in the hydrostatic circuit from being excessively elevated during operation. Such, however, is rather immaterial to the construction of the transmission system herein disclosed so that no detailed discussion will be incorporated.

In order to prevent production of noises otherwise produced in the direct drive condition of the transmission system and to minimize leakage of the fluid from the first and third fluid displacement units, it is preferable that valve means be provided for the purpose of blocking entry of the highly pressurized fluid into the cylindrical chambers of the first and third fluid displacement units, as previously mentioned.

To accommodate such valve means, the axial bores 54 and 55 in the input and output shafts have extensions which are formed, by way of example, as stepped larger-diameter bores 72 and 73. These larger-diameter bores 72 and 73 are closed at their outer ends by closure plugs 74 and 75 which are hermetically fitted to the inner peripheral walls of the input and output shafts 10 and 11, respectively.

The larger-diameter bore 72 has accommodated therewithin a piston valve 76 projecting into the axial bore 54 in the input shaft 10. The piston valve 76 has a flange 77 fitting on the inner peripheral wall of the input shaft 10 so as to divide the larger-diameter bore 72 to a constant-pressure chamber 78 and a variable-pressure chamber 79. The constant-pressure chamber 78 is defined by the flange 77 of the piston valve 76 and the closure plug 74 and communicates with the axial bore 54 in the input shaft 10 through a passage 80 which is formed longitudinally in the piston valve 76. The variable-pressure chamber 79, on the other hand, communicates with a drain passage 81 through a port 82 formed in the inner peripheral wall of the input shaft 10 and an annular groove 83 formed in the outer peripheral wall of the input shaft. The drain passage 81 is associated with the fluid supply passage 71a through a suitable control valve, not shown. This control valve is adapted to open the drain passage 81 for draining the fluid in the variable-pressure chamber 79 during the direct drive condition and to provide fluid communication between the passages 71a and 81 for replenishing the chamber 79 with the fluid from the fluid supply passage 71a during the modes of operation excepting the direct drive condition. Suitable spring means and as a compression spring 84 is mounted within the variable-pressure chamber 79, seated at one end on the flange 77 of the piston valve 76 and at the other on a stepped portion, not numbered, of the inner peripheral wall of the input shaft 10, as illustrated. The compression spring 84 thus biases the piston valve 76 toward the closure plug 74. The length of the piston valve 76 is such that the piston valve is capable of closing the radial passage 57 in the input shaft 10 when it is moved away from the closure plug 74 against the action of the compression spring 84.

Likewise, the larger-diameter bore 55 in the output shaft 11 has accommodated therein a piston valve 85 which is movable toward and away from the closure plug 75 and which projects at its leading end into the axial bore 55 in the output shaft. The piston valve 85 has a flange 86 dividing the larger-diameter bore 73 into constant pressure and variable-pressure chambers 87 and 88, respectively, which are hermetically isolated from each other. The constant-pressure chamber 87 communicates with the axial bore 55 in the output shaft 11 through a passage 89 axially formed in the piston valve 85. The variable-pressure chamber 88, on the other hand, communicates with a drain passage 90 through a port 91 formed in the inner peripheral wall of the output shaft 11 and an annular port 92 formed in the outer peripheral wall of the output shaft. Similarly to the drain passage 81 from the input shaft 10, this drain passage 90 is associated with the fluid supply passage 71a through a suitable control valve, not shown, which is adapted to open the drain passage 90 under the direct drive condition and to provide fluid communication between the passages 71a and 90 for supplying the pressurized fluid to the variable-pressure chamber 88. The variable-pressure chamber 88 has mounted therein a compression spring 93 which acts to bias the piston valve 85 toward the closure plug 75 so that the radial passage 68 in the output shaft 11 is kept open during the modes of operation excepting the direct drive condition.

When, in operation, the cylinder block of any of the fluid displacement units is driven for rotation, the ball piston elements are radially moved within the respective cylindrical chambers toward and away from the axis of rotation of the cylinder block provided a certain degree of eccentricity is established between such axis and the inner cam surface of the associated cam ring. If, for instance, the cam ring 21 of the first fluid displacement unit 13 is adjusted to be eccentric with respect to the axis of rotation of the cylinder block 16 of the unit, the ball piston element 20a will be moved inwardly and the ball piston element 20b which is diametrically opposed to the former will be moved outwardly. Such movements of the diametrically opposed ball piston elements 20a and 20b are reversed if the cam ring 21 is moved in a reverse direction so as to establish reversed eccentricity with respect to the axis of rotation of the cylinder block 16. The inward movement of any of the ball piston elements is accompanied by forced displacement of the fluid from the cylindrical chamber for the particular ball piston element, thereby giving rise to the fluid pressure in the axial bore 54 in the input shaft. The increased fluid pressure is carried to the cylindrical chambers of one or both of the other fluid displacement units, depending upon the ratio of the displacements which is instantly established between the three fluid displacement units. If, in this instance, the cam ring of the variable-displacement unit which may be the first or third fluid displacement unit is adjusted to be in concentric alignment with the axis of rotation of the associated cylinder block, then the delivery of the fluid from the particular unit is interrupted so that the unit remains inoperative on the remaining fluid displacement units. If, moreover, the displacements of any two of the fluid displacement units are equalized, the changes in the fluid pressure in the two units are compensated for each other so that these two units are inoperative on the remaining fluid displacement unit. Thus, the variation in the ratios between the displacements of the three different fluid displacement units as caused through adjustment of the relative positions of the cam rings of the first and third fluid displacement units establishes various modes of operation in the transmission system such as the neutral, underdrive, decelerating, direct drive, overdrive and reverse drive conditions.

Figure 2:
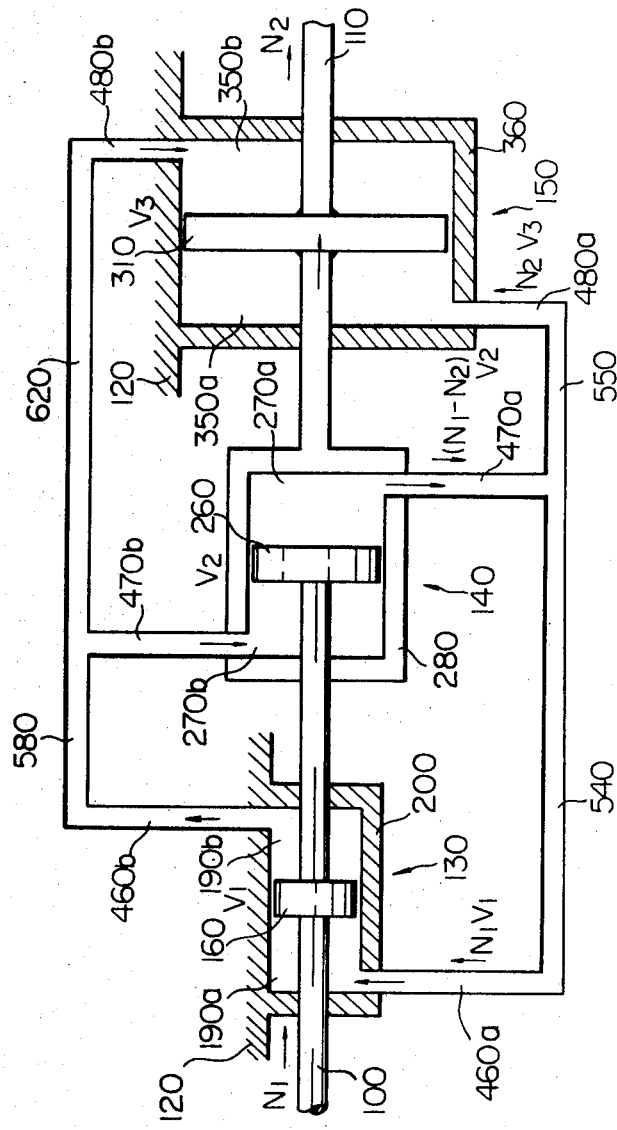
FIG. 2 is a diagrammatic view showing, on a translatory basis, fundamental modes of operation of the hydrostatic power transmission illustrated in FIG. 1.

To assist in the clear understanding of the operation of the hydrostatic power transmission system shown in FIG. 1, reference is now made to FIG. 2 in which the rotary motions of the cylinder blocks of the fluid displacement units are translated, on a simulatory basis, into rectilinear movements of linear motion pistons.

The input and output shafts 10 and 11 for the actual power transmission system are herein simulated as linear motion input and output shafts 100 and 110, respectively, which are movable back and forth relative to a transmission housing 120. The first, second and third fluid displacement units 13, 14 and 15 are translated into corresponding hydraulic units 130, 140 and 150, respectively. The first hydraulic unit 130 includes a linear motion piston 160 which is representative of the cylinder block 16 and a cylinder 200 which is representative of the ball piston elements 20a, 20b, . . . and the associated cam ring 21. The linear motion 160 is connected to the input shaft 100 through a piston rod, not numbered, and moved forwardly in the cylinder 200. The cylinder 200 is internally divided by the piston 200 into chambers 190a and 190b which are representative of the cylindrical chambers 19a and 19b. The second hydraulic unit 140 consists of a linear motion piston 260 representative of the cylinder block 26 of the second fluid displacement unit 14 and a cylinder 280 representative of a combination of the ball piston elements 28a, 28b, . . . and the associated cam ring 29. The linear motion piston 260 is connected to the piston 160 of the first hydraulic unit 130 and divides the cylinder 280 into chambers 270a and 270b representing the cylindrical chambers 27a and 27b, respectively, in the cylinder block 26. Likewise, the third hydraulic unit 150 is made up of a linear motion piston 310 corresponding to the cylinder block 31 of the third displacement unit 15 and a cylinder 360 standing for a combination of the ball piston elements 36a, 36b, . . . and the cam ring 37. The linear motion piston 310 is connected to the cylinder 200 of the second hydraulic unit 140 through a piston rod, not numbered, and divided the cylinder 360 into chambers 350a and 350b which correspond to the cylindrical chambers 35a and 35b, respectively, in the cylinder block 31. The piston 310 is further connected to the output shaft 110. The cylinders 200 and 360 of the first and third hydraulic units 140 and 150, respectively, are held stationary relative to the transmission housing 120, while the cylinder 280 of the second hydraulic unit 140 is axially movable relative to the transmission housing.

The chamber 190a of the first hydraulic unit 130 communicates with the chamber 270a of the second hydraulic unit 140 through a port 460a, a passage 540 and a port 470a. The port 460a thus represents a fluid line consisting of the radial port 46a in the cylinder block 16, the semi-circumferential groove 50a, elongated groove 51a and radial port 52a in the sleeve 49, and the annular groove 56a and radial passage 57 in the input shaft 10. The passage 540 corresponds to the axial bore 54 in the input shaft and a portion of the axial port 55 in the output shaft 11. The port 470a is representative of a fluid line constituted by the radial port 47a in the cylinder block 26, and the semi-circumferential groove 59a and radial passage 60 in the output shaft 11 associated with the second fluid displacement unit 14.

The passage 540 also communicates with the chamber 350a of the third hydraulic unit 150 through a passage 550 and a port 480a. The passage 550 corresponds to the remaining portion of the axial bore 55 in the output shaft. The port 480a represents a fluid line established by the radial port 48a in the cylinder block 31, the semi-circumferential groove 64a, elongated groove 65a and radial port 66a in the output shaft 11.

The chamber 190b of the first hydraulic unit 130 communicates with the chamber 270b of the second hydraulic unit 140 through a port 460b, a passage 580 and a port 470b. The port 460b is representative of a fluid line established by the radial port 46b in the cylinder block 16, the semi-circumferential groove 50b, elongated groove 51b and radial port 52b in the sleeve 49, and the annular groove 56b in the input shaft 10. The passage 580 corresponds to the elongated groove 58 in the input shaft 10 and the annular 61 formed between the input and output shaft 10 and 11, respectively. The port 470b is representative of a fluid line constituted by the radial port 47b in the cylinder block 26, and the semi-circumferential groove 59b in the output shaft 11 associated with the second fluid displacement unit 14.

The passage 580 also communicates with the chamber 350b of the third hydraulic unit 150 through a passage 620 and a port 480b. The passage 620 corresponds to the elongated groove 62 in the output shaft 11 while the port 480b is representative of a fluid line which is established by the radial port 48b in the cylinder block 31, the semi-circumferential groove 64b, elongated groove 65b and radial port 66b in the sleeve 63 and the annular groove 67b in the output shaft 11 associated with the third fluid displacement unit 15.

The diameters of the cylinders 200, 280 and 360 of the simulated hydraulic units are assumed to correspond to the displacements of the corresponding fluid displacement units of the actual transmission system. Thus, diameters of the cylinders 200 and 360 of the first and third hydraulic units 130 and 150, respectively, are variable while the diameter of the cylinder 280 of the second hydraulic unit 140 is kept constant.

It is now assumed that the rotational speeds of the input and output shafts are $N_1$ and $N_2$, respectively, and that the displacements of the first, second and third fluid displacement units are $V_1$, $V_2$ and $V_3$, respectively, per turn of the cylinder blocks. Here, the values $V_1$ and $V_3$ are variables and the value $V_2$ is a constant. If, thus, $N_1$ is greater than $N_2$, then the following equation will be derived from examination of the arrangement shown in FIG. 2:

$$(N_1 - N_2) \cdot V_2 = N_1 \cdot V_1 + N_2 \cdot V_3. \quad \text{(Eq. 1)}$$

Hence, the speed reduction ratio R is given by the following equation:

$$R = N_1/N_2 = (V_2 + V_3)/(V_2 - V_1) = 1 + (V_1 + V_3)/(V_2 - V_1). \quad \text{(Eq. 2)}$$

The modes of operation of the simulated power transmission shown in FIG. 2 will be accounted for by this Equation 2 as follows:

NEUTRAL CONDITION

If the value $V_3$ is held at a maximum and concurrently $V_1 = V_2$, then the speed reduction ratio R is an infinity so that the output shaft is held at a standstill. If, thus, the diameter of the cylinder 200 of the first hydraulic unit 130 is adjusted to be equal to the fixed diameter of the cylinder 280 of the second hydraulic unit, the fluid discharged from the chamber 270a as a result of the movement of the input shaft 100 is totally passed to the chamber 190a through the passage 540 with the result that no driving power is imparted to the output shaft 110. Since, in this condition, the third hydraulic unit 150 fails to deliver or receive the fluid pressure, a braking action with a relatively great magnitude is applied to the output shaft 110.

UNDERDRIVE CONDITION

If the value $V_3$ is invariably held at a maximum and at the same time a relation $0 < V_1 < V_2$ holds, then the speed reduction ratio R diminishes and the value $N_2$ increases as the value $V_1$ approaches zero. This means that, if the diameter of the cylinder 200 of the first hydraulic unit 130 is smaller than the diameter of the cylinder 280 of the second hydraulic unit 140, the chamber 190a can not afford to receive the total amount of the fluid discharged from the chamber 270a so that the fluid from the chamber 270a is partly circulated to the chamber 350a of the third hydraulic unit 150 through the passage 550. The output shaft 110 is consequently moved rightwardly of the drawing.

LOW-SPEED CONDITION

When $V_1 = 0$, the speed reduction ratio R is expressed as:

$$R = 1 + (V_3/V_2) = 1 + M, \quad \text{(Eq. 3)}$$

where $M = V_3/V_2$.

If, therefore, the value $V_3$ is decreased with $V_1 = 0$, then the speed reduction ratio R decreases and the value $N_2$ increases as the value M increases. In other words, if the inside diameter of the cylinder 200 of the first hydraulic unit 130 is in agreement with the piston rod for the piston 160 so that the chamber 190a has a zero capacity, then the fluid discharged from the 270a of the second hydraulic unit 140 is totally passed to the chamber 350a of the third hydraulic unit 150 through the passage 550. Thus, the piston 310 of the third hydraulic unit 150 is subjected not only to a reaction of the cylinder 280 to the fluid pressure in the chamber 270a but to the fluid pressure thus built up in the chamber 350a.

The output shaft 110 is, therefore, decelerated at a speed considerably higher than during the underdrive condition if the displacement of the first hydraulic unit 130 is interrupted and at the same time the displacement of the third hydraulic unit 150 is increased.

DIRECT DRIVE CONDITION

If $V_1 = V_3 = 0$, then $R = 1$ so that the output shaft is driven at the same speed as the input shaft. If, thus, the inside diameters of the cylinders 200 and 360 of the first and third hydraulic units 130 and 150 are equal to the diameters of the piston rods for the reciprocating positors 160 and 310, respectively the fluid in the 270a is constrained therewithin with the result that a hydraulic lock condition is built up. The input shaft 100, second hydraulic unit 140 and output shaft 110 consequently act as an integral unit so that the output shaft 110 is driven at the same speed as the input shaft 100.

OVERDRIVE CONDITION

If $V_3 = 0$ and $V_1 < 0$, then the second term of Equation 2 assumes a minus value which is greater than $-1$. Accordingly, the speed reduction ratio $R$ is smaller than 1 so that the value $N_2$ is greater than the value $N_1$. To make the value $V_1$ minus is to have the passages 540 and 580 reversed from each other. The passage 540 leading from the chamber 190a of the first hydraulic unit 130 is open to the chamber 270b of the second hydraulic unit 140, while the passage 580 is open to the chamber 270a. The diameter of the cylinder 360 is equal to the diameter of the piston rod for the reciprocating piston 310 so that the displacement of the third hydraulic unit 150 is interrupted. The fluid discharged from the chamber 190b resulting from the movenent of the input shaft 100 is thus circulated to the chamber 270a of the second hydraulic unit 140. The result is that the output shaft 110 is driven by the power resulting from the movement of the piston 260 in the cylinder 280 plus the fluid power resulting from the delivery of the fluid from the chamber 190b to the chamber 270a. The output shaft 110 is accordingly driven at a higher speed than the input shaft 100, whereby the overdrive condition is established.

REVERSE DRIVE CONDITION

If the value $V_3$ is held at a maximum and concurrently $V_1 > V_2$, then the second term of Equation 2 assumes a minus value which in this instance is smaller than $-1$. The speed reduction ratio $R$ is consequently minus so that the values $N_1$ and $N_2$ have opposite signs, viz., the output shaft is driven in an opposite direction to the input shaft. In other words, if the diameter of the cylinder 200 of the first hydraulic unit 130 is larger than the diameter of the cylinder 280 of the second hydraulic unit 140 and if the diameter of the cylinder 360 of the third hydraulic unit 150 is increased to a maximum, then the fluid discharged from the chamber 190b of the first hydraulic unit 130 as a result of the movement of the input shaft 100 is passed partly to the chamber 270b of the second hydraulic unit 140 through the passage 580 and partly to the chamber 350b of the third hydraulic unit 150 through the passage 620 branched from the passage 580. The piston 310 of the third hydraulic unit 150 is accordingly moved leftwardly of the drawing so that the output shaft 110 is driven in the reverse direction.

It will now be understood from the above discussion that the second hydraulic unit 140 operates in a manner that action and reaction are exercised between the piston 260 and the cylinder 280 and that the unit is movable in its entirety. The second hydraulic unit is thus capable of transmitting the power in a mechanical fashion.

Under the underdrive condition in which the displacement of the first hydraulic unit is smaller than the displacement of the second hydraulic unit, the fluid displaced from the second displacement unit is divided into two portions. One of such portions of the fluid is passed to the first hydraulic unit so as to add to the driving power for the piston therein and the other of the portions is passed to the third hydraulic unit so as to add to the driving power for the piston therein. The transmission therefore operates in a manner to have its fluid split-power into input and output components under the underdrive condition.

Under the condition at a relatively high speed, the third hydraulic unit receives not only the fluid power resulting from the delivery of the fluid from the second hydraulic unit but the power mechanically transmitted thereto by the reaction of the cylinder of the second hydraulic unit to the movement of the piston thereof. The power supplied is thus split into two output components.

When the overdrive condition is established in which the fluid in the first hydraulic unit is circulated to the second hydraulic unit, the piston of the third hydraulic unit is subjected to the mechanical power resulting from the reaction of the cylinder of the second hydraulic unit to the piston thereof which is directly moved by the input shaft and to the fluid power resulting from the fluid passed to the second hydraulic unit. The power supplied to the transmission is in this manner split into two output components.

In the reverse drive condition in which the displacement of the first hydraulic unit is smaller than that of the second hydraulic unit, the fluid power is split into two input components, one being passed to the second hydraulic unit and the other to the third hydraulic unit.

The operation of the piston valves 76 and 85 will now be described with reference to FIG. 1. As formerly mentioned, these piston valves 76 and 85 are intended to block entry of the pressurized fluid into the first and third fluid displacement units during the direct drive condition in which the displacements of these fluid displacement units are interrupted to cause the input and output shafts 10 and 11 and the transmission system to operate as an integral unit.

When, thus, the first and third fluid displacement units 13 and 15 become inoperative to deliver the fluid, then the previously mentioned control valves associated with the drain passages 81 and 90 are actuated to open these drain passages. The fluid staying in the variable-pressure chambers 79 and 88 of the larger-diameter bores 72 and 73, respectively, is in this manner drained off. The piston valves 76 and 85 are consequently moved against the actions of the compression springs 84 and 93 away from the closure plugs 74 and 75 by the pressure obtaining in the constant-pressure chambers 78 and 87, respectively. The piston-valve 76 and 85 protrudes deeper into the axial bores 54 and 55 in the input and output shafts 10 and 11, respectively, thereby closing the radial passages 57 and 68 leading from the axial bores 54 and 55, respectively. The pressurized fluid in the axial bores 54 and 55 is consequently prevented from entering the first and third fluid displacement units 13 and 15. Thus, even though the radial ports in the cylinder blocks 16 and 31 are periodically opened due to the variation in the angular positions of the cylinder blocks relative to the sleeves 49 and 63 as these cylinder blocks rotate about their axes, the pulsating fluid pressure in the axial bores 54 and 55 is not carried to the cylindrical chambers in the cylinder blocks. This is useful in avoiding production of the noises in the first and third fluid displacement units and in minimizing the leakage of the fluid from the cylinder blocks of the units.

When the direct drive condition is to be terminated, the control valves for the drain passages 81 and 90 are shifted to positions to provide communication between these passages and the fluid supply passage 71a. The variable-pressure chambers 79 and 88 are consequently replenished with the fluid under pressure so that the piston valves 76 and 85 restores their initial positions with the fluid in the constant-pressure chambers 78 and 87 recirculated to the axial bores 54 and 55 through the passages 80 and 89, respectively.

The hydrostatic power transmission system which has thus far been described in detail has outstanding features which are enumerated as follows:

a. Simplicity of construction.

b. Capability of dealing with powers of relatively great magnitudes in spite of the small-sized construction.

c. Ease of operation and maintenance servicing.

d. Speeds and torques varied over a stepless range in either direction from zero to maximum.

e. Split-power characteristics in which the supplied power is transmitted partly in a mechanical fashion and partly in a hydraulic fashion in various modes of operation, thereby significantly adding to the transmission efficiency.

f. Void of mechanical clutches and/or geared reduction mechanisms.

g. Minimized loss in the transmission efficiency during the direct drive condition in which only the second fluid displacement is operative to establish the hydraulic lock condition.

h. Minimized noises and leakage of the fluid from the first and third fluid displacement units during the direct drive condition in which the displacement of these units are interrupted.

Figure 3:
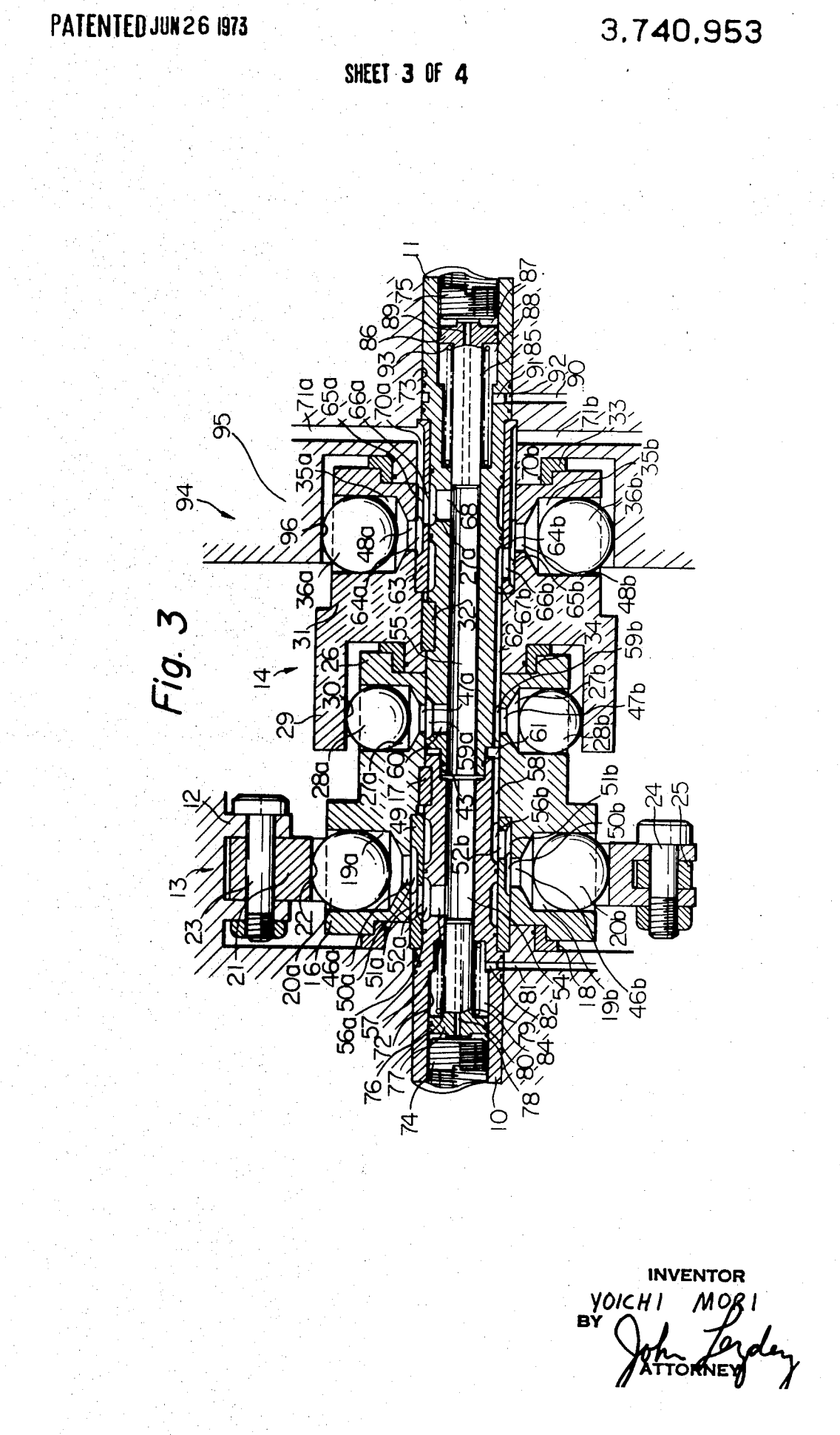

A second preferred embodiment of the hydrostatic power transmission in accordance with this invention is now illustrated in FIG. 3. The transmission system shown in FIG. 3 is similar to the system shown in FIG. 1 in that it uses first and second fluid displacement units as variable-displacement and constant-displacement units, respectively. Different from the system of FIG. 1, the modified system includes a third fluid displacement unit acting as a constant displacement unit. The third fluid displacement unit, which as such is designated by new reference numeral 94, thus includes a cam ring 95 which is stationary relative to the transmission housing 12. This cam ring 95 may be either securely connected to the transmission housing 12 or formed as integral with the transmission housing. Similarly to the cam ring 37 of the third fluid displacement unit 15 of the first embodiment, the cam ring 95 has a circular inner cam surface with the ball piston elements 36a, 36b, . . . , respectively received within the cylindrical chambers 35a, 35b, . . . in the cylinder block 31 are in frictional engagement. Designated by 96 is an annular groove formed in the cam surface of the cam ring 95.

Furthermore, the transmission system shown in FIG. 3 is void of the piston valves 76 and 85 which are used in the system shown in FIG. 1. Thus, the axial bores 54 and 55 in the input and output shafts 10 and 11 are closed at their opposed ends which are close to the ends of the first and third fluid displacement units, respectively, as shown.

Figure 4:
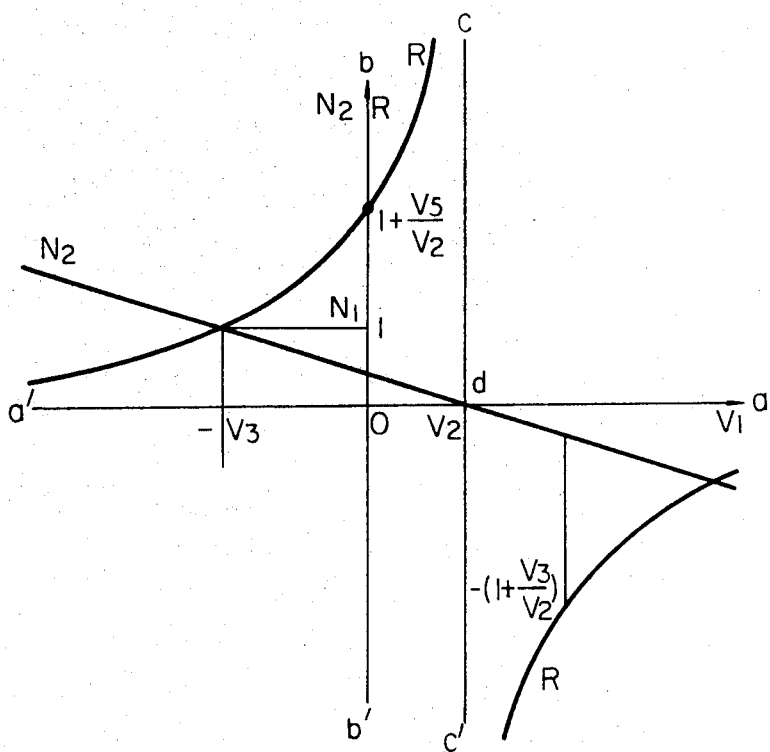
FIG. 4 is a view graphically demonstrating performance characteristics of the power transmission system shown in FIG. 3.

Thus, in the transmission system shown in FIG. 3, the speed reduction ratio can be varied by varying the displacement of the first fluid displacement unit 13 through adjustment of the angular position of its cam ring 21 with respect to the associated cylinder block 16. The speed reduction ratio R and the rotational speed of the output shaft 11 are accordingly expressed as:

$$R = (V_2 - V_3)/(V_2 - V_1), \text{ and} \quad (\text{Eq. 4})$$

$$N_2 = V_2 - V_1/V_{V2} + V_3 \cdot N_1, \quad (\text{Eq. 5})$$

where the values $V_2$ and $V_3$ are constants. These equations are graphically represented by curves $R$ and a line $N_2$ in FIG. 4, in which the rotational speed $N_1$ of the input shaft is assumed to be a constant. The axis $a'-a$ of abscissa stands for the variation in the displacement $V_1$ of the first fluid displacement unit while the axis $b'-b$ of ordinate stands for the variations in the speed reduction ratio $R$ and the rotational speed $N_2$ of the output shaft. The speed reduction ratio $R$ is thus represented by a hyperbola having asymptotes $a'-a$ and $c'-c$ which perpendicularly intersects the axis $a'-a$ of abscissa at point $d$ which is indicative of the value $V_2$. The speed reduction ratio $R$ thus assumes a plus value if the value $V_1$ is smaller than the value $V_2$ and a minus value if the value $V_1$ is greater than the value $V_2$. The rotational speed $N_2$ of the output shaft is represented by a straight line passing through the point $d$ at which the value $V_1$ equals the value $V_2$. As a consequence, the output shaft is brought to a standstill if the displacement $V_1$ of the first fluid displacement unit is adjusted to the displacement $V_2$ of the second fluid displacement unit, whereby the neutral condition is established. If the displacement $V_1$ is increased beyond the displacement $V_2$, then the output shaft is driven in a direction reverse to the direction of rotation of the input shaft, thereby establishing the reverse drive condition. If, conversely, the displacement $V_1$ becomes smaller than the displacement $V_2$, then the output shaft is driven in the same direction as the input shaft so as to establish the underdrive or low-speed condition. If, furthermore, the direction of the displacement of the first fluid displacement unit is reversed and if the absolute values of the displacements of the first and third fluid displacement units are equalized to each other so that $V_1 = -V_3$, then the output shaft is driven at the same speed and in the same direction as the input shaft. This establishes the direct drive condition.

If the displacement in either direction, of the first fluid displacement unit is greater than the displacement of the third fluid displacement unit so that $V_1 > V_3$, then the output shaft outspeeds the input shaft to establish the overdrive condition.

The features of the hydrostatic power transmission thus constructed and operating are summarized as follows:

a. Simplicity of constuction.

b. Split-power characteristics in which the supplied driving power is split into mechanical and fluid powers or into input or output component or a combination of input and output components.

c. The power input is directly transmitted in part to the first fluid displacement unit and in part to the second fluid displacement unit. The second fluid displacement unit drives the output shaft by its reaction resulting from the fluid power transmitted thereto. No loss in the mechanical power is consequently invited in the power transmission by the second fluid displacement unit. On the other hand, the combined fluid pressures built up by the first and second fluid displacement units act on the third fluid displacement unit so as to hydrostatically produce a torque therein. A loss in the hydraulic power is thus invited in the third fluid displacement unit. This loss, however, results in drops of the transmission efficiency which are comparable to those experienced in hydrostatic power transmissions in which the power input is transmitted totally in a hydrostatic fashion. Such drops in the transmission efficiency can be offset by the increased transmission efficiency attained by the mechanical power transmission by the second fluid displacement unit. As a consequence, the total transmission efficiency which is attained in the transmission system as a whole is maintained at a considerably elevated level.

d. Simplicity of operation, especially in regulating the displacement ratios between the three fluid displacement units. Such ratios can be varied simply by adjusting the relative position of only one adjustable cam ring of the first fluid displacement unit.

What is claimed is:

1. A hydrostatic power transmission system for delivering a driving torque from an input shaft to an output shaft which is in line with the input shaft comprising, in combination, first, second and third fluid displacement units each comprising a rotatable cylinder block coaxial with the input and output shafts and a cam ring positioned around said cylinder block, the cylinder blocks of the first and second fluid displacement units being rotatable with said input shaft, the cam ring of the second fluid displacement unit and the cylinder block of the third fluid displacement unit being in driving engagement with said output shaft, each of said cylinder blocks having a plurality of cylinders which are directed toward an axis of rotation of the cylinder block and a plurality of piston elements which are respectively received within said cylinders and movable toward and away from said axis, said piston elements being in frictional engagement with said cam surface of the associated cam ring, the cam ring of the first fluid displacement unit being movable over the associated cylinder block in a plane substantially transverse to the axis of rotation of the cylinder block for providing controlled degrees of eccentricity between the cam surface of the particular cam ring and the axis of rotation of the associated cylinder block, actuating means for moving the cam ring of said first fluid displacement unit in said plane for varying the displacement of the first fluid displacement unit, the cam ring of the second fluid displacement unit being held stationary for keeping constant the displacement of the second fluid displacement unit, and fluid pressure distribution passage means providing controlled fluid communication between the cylinders of said first, second and third fluid displacement units for radially outwardly biasing said piston elements within each of the cylinders, said first fluid displacement unit being operable to displace the fluid in either direction from zero to maximum.

2. A hydrostatic power transmission system according to claim 1, in which the maximum displacement per turn of the cylinder block of the first displacement unit being smaller than the displacement per turn of the cylinder block of said second fluid displacement unit, said third fluid displacement unit being operable to displace the fluid in a fixed direction.

3. A hydrostatic power transmission system according to claim 1, in which the cam ring of said first fluid displacement unit is moved relative to the associated cylinder block to a position in which the displacement of the first fluid displacement unit is smaller than the displacement of the second fluid displacement unit for causing said output shaft to be driven at a speed relatively lower than and in the same direction as said input shaft to provide an underdrive condition.

4. A hydrostatic power transmission system according to claim 1, in which the cam ring of the first fluid displacement unit is moved relative to the associated cylinder block to a position in which the displacement thereof equals the displacement of the second fluid displacement unit for causing said output shaft to stop to provide a neutral condition.

5. A hydrostatic power transmission system according to claim 1, in which the cam ring of said third fluid displacement unit is movable over the associated cylinder block in a plane substantially transverse to an axis of rotation of the cylinder block for providing controlled degrees of eccentricity between the cam surface of the cam ring and the axis of rotation of the cylinder block, said system further comprising actuating means for displacing the cam ring of said third fluid displacement unit in said plane for varying the displacement of the third fluid displacement unit, said cam ring of the third fluid displacement unit being moved relative to the associated cylinder block to a position providing a maximum displacement of the third fluid displacement unit during neutral, underdrive and reverse drive conditions.

6. A hydrostatic power transmission system according to claim 5, in which the cam ring of said first fluid displacement unit is adjusted to be in concentric alignment with the associated cylinder block to interrupt the displacement of the first fluid displacement unit to cause said output shaft to be driven at a speed lower than said input speed but higher than the speed of rotation of the output speed during the underdrive condition, wherein the cam ring of said third fluid displacement unit is moved relative to the associated cylinder block to a position in which the displacement of the third fluid displacement unit is decreased for establishing a low-speed condition.

7. A hydrostatic power transmission system according to claim 5, in which the cam rings of the first and third fluid displacement units are moved relative to the associated cylinder blocks to be in concentric alignment with these cylinder blocks to interrupt the displacements of the two units concurrently for causing said output shaft to be driven at the same speed and in the same direction as said input shaft to establish a direct drive condition.

8. A hydrostatic power transmission system according to claim 5, in which the cam ring of the first fluid displacement unit is moved relative to the associated cylinder block to a position in which the direction of the displacement thereof is reversed and concurrently the cam ring of the third fluid displacement unit is moved relative to the associated cylinder block to be in concentric alignment with the cylinder block to cause said output shaft to be driven at a higher speed than said input shaft to establish an overdrive condition.

9. A hydrostatic power transmission system according to claim 5, further comprising valve means operable to block entry of pressurized fluid into said first and third fluid displacement units during a direct drive condition.

10. A hydrostatic power transmission system according to claim 1, in which the cam ring of the third fluid displacement unit is held stationary.

11. A hydrostatic power transmission system according to claim 10, in which the cam ring of the first fluid displacement unit is moved relative to the associated cylinder block to a position in which the displacement of the first fluid displacement unit is smaller than the displacement of the second fluid displacement unit for causing said output shaft to be driven in the same direction as said input shaft.

12. A hydrostatic power transmission system according to claim 10, in which the cam ring of said first fluid displacement unit is moved relative to the associated cylinder block to a position in which the displacement of the first fluid displacement unit is larger than the displacement of the second fluid displacement unit for causing said output shaft to be driven in a reverse direction to said input shaft.

13. A hydrostatic power transmission system according to claim 10, in which the cam ring of said first fluid displacement unit is moved relative to the associated cylinder block to a position in which the displacement in a reversed direction of the first fluid displacement unit equals the displacement of the third fluid displacement unit.

14. A hydrostatic power transmission system according to claim 10, in which the cam ring of the first fluid displacement unit is moved relative to the associated cylinder block to a position in which the displacement in either direction of the first fluid displacement unit is greater than the displacement of the third fluid displacement unit.

15. A hydrostatic power transmission system according to claim 1, further comprising a first stationary sleeve which is interposed between said input shaft and the cylinder block of said first fluid displacement unit and a second stationary sleeve which is interposed between said output shaft and the cylinder block of said third fluid displacement unit, said fluid pressure distribution passage being formed by radial ports formed in inner peripheral walls of the cylinder blocks of said first, second and third fluid displacement units and communicating with said cylinders therein, a pair of diametrically spaced semi-circumferential grooves formed in an outer peripheral wall of said stationary sleeve and aligned with said radial ports in the cylinders of said first fluid displacement unit, a pair of elongated grooves formed in the outer peripheral wall of said first stationary sleeve and communicating with said semi-circumferential grooves respectively, a pair of radial ports formed in an inner peripheral wall of said first stationary sleeve communicating with said elongated grooves respectively, a pair of spaced annular grooves formed in an outer peripheral wall of said input shaft and constantly communicating with said radial ports in said first stationary sleeve, an axial bore formed in said input shaft and opened at its terminal end, a radial passage formed in said input shaft providing communication between one of said annular grooves, an elongated groove formed in the outer peripheral wall of said input shaft and terminating at said terminal end of the input shaft, said elongated groove in said inner shaft communicating with the other of said annular grooves, an annular groove formed between conjoined ends of the input and output shafts, an axial bore formed in said output shaft and opened at its starting end, the axial bores in said input and output shafts being in communication with each other and substantially coextensive with said first, second and third fluid displacement units, a first radial passage formed in said output shaft and communicating with said axial bore in the output shaft, a pair of diametrically spaced semi-circumferential ports formed in an outer peripheral wall of said output shaft and aligned with said radial ports in the cylinders of said second fluid displacement unit, one of which semi-circumferential ports communicates with said first radial passage and the other of which semi-circumferential ports communicates with said annular groove between said joined ends of the input and output shafts, an elongated groove formed in the outer peripheral wall of said output shaft and communicating with said other of said semi-circumferential ports in the input shaft, a second radial passage formed in said output shaft and communicating with said axial bore in the output shaft, said radial bore in said input shaft and the first and second radial passages in said output shaft being aligned with each other and diametrically opposed to the elongated grooves in the outer peripheral walls of the input and output shafts, a pair of spaced annular grooves formed in the outer peripheral wall of said output shaft and communicating respectively with said second radial passage and said elongated groove in said output shaft, a pair of radial ports formed in an inner peripheral wall of said second stationary sleeve and constantly communicating respectively with said annular grooves in said output shaft, a pair of elongated grooves formed in an outer peripheral wall of said second stationary sleeve and communicating respectively with said radial ports therein, a pair of diametrically spaced semi-circumferential ports formed in the outer peripheral wall of said second stationary sleeve and communicating respectively with said elongated grooves therein, said semi-circumferential ports in the second stationary sleeve being aligned with said radial ports in the cylinders of said third fluid displacement unit, and a pair of valved fluid supply passages communicating with said radial ports in said second stationary sleeve and with a source of pressurized fluid.

16. A hydrostatic power transmission system according to claim 15, further comprising valve means for closing said radial passage in said input shaft and said second radial passage in said output shaft when the cam rings of the first and third fluid displacement units are moved relative to the associated cylinder blocks to be in concentric alignment with the cylinder blocks for interrupting the displacements of the two fluid displacement units to establish a direct drive condition.

17. A hydrostatic power transmission system according to claim 16, in which said valve means comprises a pair of piston valves axially movably accommodated within first and second larger-diameter bores extending from opposed ends of said axial bores in said input and output shafts respectively, said larger-diameter bores being closed at their outer ends by closure plugs respectively, said valve pistons projecting at their leading ends into said axial bores in said input and output shafts respectively, each of said valve pistons having a flange by which the larger-diameter bore receiving the piston therewithin is divided into constant-pressure and variable-pressure chambers and a passage formed therein for providing communication between the constant-pressure chambers of the two larger-diameter bores and said axial bores in said input and output shafts, and a pair of spring means each mounted within said variable-pressure chambers and biasing each of said pistons toward each of said closure plugs, the variable-pressure chambers being respectively in communication with said fluid supply passages through respective drain passages which are provided with control valves for usually providing communication between said fluid supply and drain passages for causing said valve pistons be moved toward said closure plugs by a fluid pressure passed to the variable-pressure chambers and for opening said drain passages during said direct drive condition to cause said valve pistons to move to positions to close said radial passage in said input shaft and said first radial passage in said output shaft.

* * * * *